Patented Apr. 6, 1948

2,438,890

UNITED STATES PATENT OFFICE 2,438,890

METHOD OF MAKING BITUMEN COATED FIBROUS MATERIAL

Charles M. Baskin, Toronto, Ontario, Canada, assignor to Standard Oil Development Company, a corporation of Delaware No Drawing. Application July 29, 1944, Serial No. 547,278

4 Claims. (Cl. 117—30)

This invention relates to improvements in the production of prefabricated roofing or surfacing materials, and particularly to the improvements in the water-repellent properties by the use of especially designed water-repellent materials.

According to this invention a combination of calcium carbonate and stearic acid in finely pulverized state produces a powder of high water-repellent properties. It was also found that ordinary lime, slaked or unslaked, can be combined by grinding or pulverizing with small quantities of stearic acid to produce a highly water-repellent powder. Stearic acid, itself, is very water-repellent and can really be used as such in the form of a spray, hot, or by dissolving the stearic acid in a suitable solvent and applying cold. When the fatty acid, however, is combined with calcium, forming a calcium soap, it results in greater water-repellency. Furthermore, the combination of fatty acids with calcium reduces the quantity of fatty acids required when used by itself. Thus, ordinary lime can be combined with stearic acid in the proportions of about 95% of lime and 5% of stearic acid to give a highly repellent powder. It is, therefore, advantageous to produce the water-repellent substances in this manner.

Brittle bitumen pulverized, together with small quantities (5 to 20%) of stearic acid, will produce a water-repellent combination. It is, however, more economical to combine a pulverized bitumen with a calcium stearic acid powder, that may be termed "stearated calcium carbonate."

The method of application of these substances, as a surfacing in roofing of all types, is as follows. The surface of the roofing material can be treated with powder prepared as above by sprinkling the roofing with the powder and rolling or compressing. This method has special application use or utility to a cold roofing or cold surfacing process, where a bitumen saturated fibrous material coated with powdered bitumen is made to adhere to and waterproof a surface, or where a plurality of fibrous materials are built up to waterproof a surface, because it makes possible to obtain satisfactory adhesion in wet weather. While roofs are not ordinarily laid in rainy weather, a good deal of roofing has to be done on moist surfaces and in damp weather. The use of these water-repellent powders under such conditions insures a good bond.

Limestone may be treated with stearic acid, or similar fatty acids, in such a manner as to produce granulated limestone particles for imbedding in roofing materials, which particles will be water-repellent unlike the present granules or mineral particles used in the roofing industry, which are not water-repellent and cause considerable difficulty. This is done by first crushing limestone down to the desired size, then immersing the limestone particles in a solution of stearic acid and naphtha. A variety of solvents may be used but volatile petroleum distillates are probably the most common and the most suitable. The limestone particles are then removed from the solution and dried, leaving the fine films of stearic acid to act on the calcium and give the particles water-repellency. While reference is made above to calcium carbonate combined with stearic acid, it will be understood that the invention contemplates the use of other metallic salts derived from stearic acid as well as stearic acid itself.

Incidentally, various colors may be added in the stearic acid naphtha solution, thereby coloring the particles, producing a desired decorative effect.

I claim:

1. The method of preparing a water repellent bituminous coating composition capable of adhering in damp weather to a moist surface which comprises impregnating a fibrous material with a bituminous saturant and coating said material with a pulverized asphalt of high melting point mixed with a powdered metallic salt of stearic acid.

2. A method of providing a bituminous water repellent composition which will readily amalgamate when placed in layers and is not affected by moisture, which comprises coating a saturated fibrous material with bituminous water-proofing compound and a powdered mixture layer containing pulverized asphalt and powdered stearic acid.

3. A method of preparing a surfacing material which comprises coating a fibrous material with bituminous material and sprinkling said coated fabric with a water repellent powder comprising powdered asphalt of high melting point and a powdered material selected from the group which consists of stearic acid and metal salt derivatives thereof.

4. A method as in claim 3 wherein said water repellent powder comprises powdered asphalt of high melting point and powdered lime combined with stearic acid.

CHARLES M. BASKIN.

REFERENCES CITED

The following references are of record in the file of this patent:

UNITED STATES PATENTS

| Number | Name | Date |
|---|---|---|
| 2,023,068 | Flood | Dec. 3, 1935 |
| 2,192,284 | Dahberg | Mar. 5, 1940 |
| 2,194,427 | Kirschbraun | Mar. 19, 1940 |
| 2,286,414 | Hershberger | June 16, 1942 |
| 1,965,703 | Hyde | July 10, 1934 |
| 2,022,429 | Merriam | Nov. 26, 1935 |
| 2,232,695 | Durnston et al. | Feb. 25, 1941 |

FOREIGN PATENTS

| Number | Country | Date |
|---|---|---|
| 543,625 | Great Britain | Mar. 5, 1942 |